(12) United States Patent
Circenis et al.

(10) Patent No.: US 7,877,607 B2
(45) Date of Patent: Jan. 25, 2011

(54) TAMPER-EVIDENT DATA MANAGEMENT

(75) Inventors: Edgar Circenis, Loveland, CO (US); John R. Diamant, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1506 days.

(21) Appl. No.: 10/231,043

(22) Filed: Aug. 30, 2002

(65) Prior Publication Data

US 2004/0054908 A1   Mar. 18, 2004

(51) Int. Cl.
    *H04L 9/32* (2006.01)
(52) U.S. Cl. ........................ 713/170; 380/229
(58) Field of Classification Search ............. 713/170
    See application file for complete search history.

(56) References Cited

U.S. PATENT DOCUMENTS

| | | | | |
|---|---|---|---|---|
| 5,613,012 A * | 3/1997 | Hoffman et al. | ............ | 382/115 |
| 5,799,093 A * | 8/1998 | French et al. | ............ | 380/51 |
| 5,862,223 A * | 1/1999 | Walker et al. | ............ | 705/50 |
| 6,044,464 A * | 3/2000 | Shamir | ............ | 713/186 |
| 6,396,928 B1 * | 5/2002 | Zheng | ............ | 380/285 |
| 7,043,636 B2 * | 5/2006 | Smeets | ............ | 713/170 |
| 7,162,035 B1 * | 1/2007 | Durst et al. | ............ | 380/54 |
| 7,519,668 B2 * | 4/2009 | Goodman et al. | ............ | 709/206 |
| 2002/0112160 A2 * | 8/2002 | Wheeler et al. | ............ | 713/170 |
| 2008/0195865 A1 * | 8/2008 | Nikander | ............ | 713/170 |

OTHER PUBLICATIONS

Schneier, Bruce, Applied Cryptography, 1996, John Wiley and Sons, Second Edition, p. 38.*
Schneier, Bruce, Applied Cryptography, 1996, John Wiley and Sons, Second Edition, pp. 37 and 41-42.*

* cited by examiner

*Primary Examiner*—Farid Homayounmehr

(57) ABSTRACT

A tamper-evident data management system uses public-private digital signature keys to control use of data and to ensure the fidelity of data that is stored on a customer's system for later collection by a computer vendor or that is sent to the vendor over a network. A computer system includes an application for collecting usage or metrics data from the computer system, for example. The metering application uses an application private key to digitally sign all metrics data prior to optionally storing the data in a data log file. The vendor can then use an application public key to validate the digitally signed entries. The digitally signed data entries may also be encrypted using a vendor public key prior to storage in the data log and may be decrypted using a vendor private key prior to validating the digitally signed data. The application and application private key may be stored on a smart card to discourage and detect tampering or may be stored on the computer system itself.

18 Claims, 6 Drawing Sheets

TAMPER-EVIDENT DATA MANAGEMENT

TECHNICAL FIELD

The technical field is in the secure logging and measuring of computer system metrics data.

BACKGROUND

Computer system administrators, or other computer users, may be called on to oversee specific functions, wherein the administrators may not be fully trusted to supervise execution of the functions. One such example involves collection and reporting of computer system usage data in a pay-per-use computer system. Another example involves use of licensed copies of software programs installed in a computer network.

Instant capacity-on-demand (iCOD) allows an iCOD administrator to acquire a computer system with multiple central processing units (CPUs) not all of which are necessarily active. The iCOD administrator may scale-up processing power at anytime by activating inactive CPUs, and may scale down processing power by deactivating active CPUs.

Pay-per-use systems allow a computer system administrator to control costs by paying only for actual usage of computer system resources, such as CPUs. Thus, in both iCOD and pay-per-use systems, "computing" is provided in a way that is analogous, at least in some respects, to the way in which electricity and other utilities are provided to commercial and residential customers. Using this analogy, iCOD is like adding capacity (e.g. increasing the size of the water main or upgrading to a higher amperage electrical feed) to a system and paying for it at the time it is added. Pay-per-use is like metering (e.g. how much water was transferred or how much electricity was transferred) and paying for the metered amount. In both cases (and others like monitoring software use, etc.) the current state of the system needs to be tracked (either to ensure that unlicensed capacity is not being used, or to record the use of capacity for billing purposes). This tracking can be done over the network, or via a log file. In both cases, the vendor (i.e. the utility) is concerned with the integrity of the data and wants to be able to detect if the data has been tampered with.

Capacity monitoring software on the iCOD computer periodically measures CPU usage data. The CPU usage data may then be transmitted to the computer system vendor for monitoring and control functions. However, certain computers that operate on isolated networks may be unable to transmit the CPU usage data. These isolated networks may be found in high security environments and typically must stay isolated to guarantee against intrusions or accidental dissemination of confidential or sensitive information. This need for security exacerbates the collection of CPU usage data.

SUMMARY

What is disclosed is a tamper-evident data management system for use on a client computer system, comprising an application that executes on the client computer system, wherein the application includes means for controlling access to the application; and means for detecting tampering of the application, comprising means accessible only to the application for signing the controlling means.

What is also disclosed is a tamper evident usage data collection system, a corresponding method for storing and validating the data in tamper evident form, and a corresponding data log. The tamper evident usage data collection system runs on a computer system and may include an application program 120, a data log stored on the computer system, and a digital signature application and a validation application. The application program 120 may collect metrics data and the digital signature application creates a digital signature that is attached to the collected metrics data. The digitally signed metrics data may be stored in the data log on the computer system and the application private key may be stored on a smart card but may also be stored on the computer system. The digitally signed metrics data may be collected and moved to the validation application controlled by the system vendor.

The method for storing and validating the data in tamper evident form begins by gathering metrics data from the computer system and digitally signing the metrics data using a private signature key. The digitally signed metrics data is then stored in a data log, which is then provided to a validation application. Validating the digitally signed metrics data uses a public signature key that is the counterpart of the private signature key.

A computer readable medium including a program is also disclosed, where the program executes a tamper-evident method for gathering and logging computer metrics data. The program first periodically gathers the metrics data from a computer system and digitally signs the metrics data with a private signature key. The program then stores the digitally signed metrics data into a data log.

A computer readable medium including a data structure for data logging is disclosed, where the data structure includes a table of at least one data row or data log entry. Each data log entry includes a computer metrics data element, a sequence number for that data log entry, information identifying the computer from which the data element is obtained, along with a digital signature of the data log entry, including the metrics data element, the sequence number and system identifying information for the data entry.

DESCRIPTION OF THE DRAWINGS

The detailed description will refer to the following drawings, wherein like numerals refer to like elements, and wherein.

DETAILED DESCRIPTION

Data collected or resident at a first location may be altered, or otherwise tampered with by customers at the first location. The altered data may then be used by the first location customers, or may be transmitted, or otherwise transferred, to a second location. The alteration of the data may affect the rights of the owners or recipients of the data. For example, the altered data may be computer usage data collected by a pay-per-use computer system, altered by the pay-per-use customer to reflect a lower than actual usage, and subsequently transferred to the pay-per-use vendor. The pay-per-use vendor may then receive a lower than nominal rental fee for use of the computer system. In another example, the data may be software or file inventory information that the first location customer has altered with the result that the data misrepresents the software or files that are installed or are being used at the first location. This in turn may prevent the vendor at the second location from ensuring that unauthorized or unlicensed software or files aren't loaded or used at the first location. A specific example of digital rights management would be the detection and reporting of copyrighted music files at a first location for the purpose of determining if the first location customer has the right to possess those files. In another example of data tampering, a customer at the first location may attempt to alter that data to change its apparent source, again to the detriment of the data owner. These examples of data tampering may be impossible to prevent. However, the data owner may be able to detect instances of data tampering, and to take remedial action against the customer. In general, evidence of data tampering may be desirable in any application in which the application administrators can not, or should not, be trusted to complete the application. More specifically, a tamper evidence system may be desired as an adjunct to a computer system when a function is executed on the computer system by authorized computer system administrators who can not, or should not, be fully trusted to perform the function.

Figure 1:
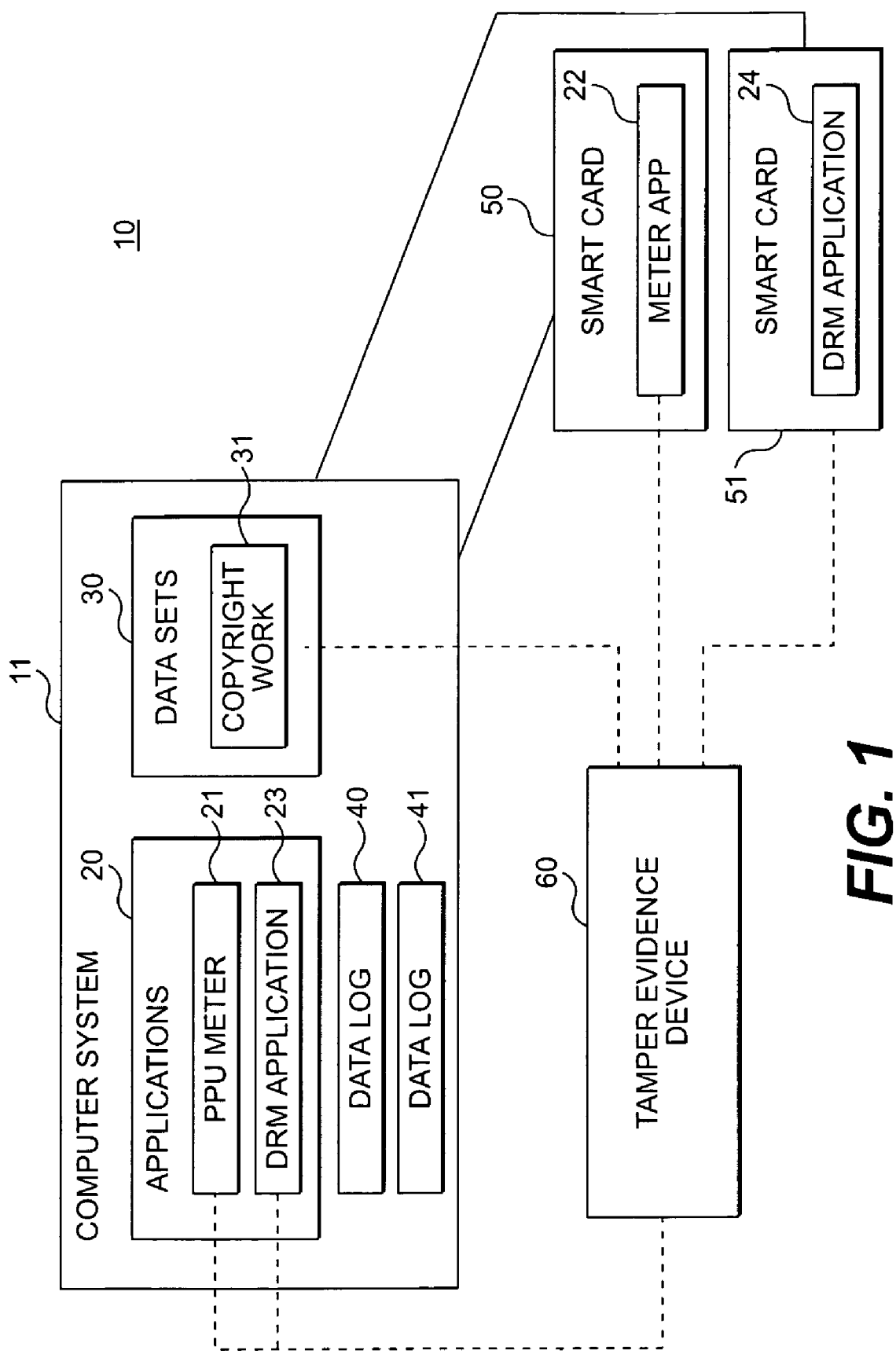
FIG. 1 is a block diagram of a computer system employing tamper-evident data management.

Referring to FIG. 1, to provide tamper-evident data management, a tamper evidence system 10 may be installed on a computer system 11, where the computer system 11 includes applications 20 and data sets 30 that are subject to tampering by administrators (i.e., local users) of the computer system 11. The applications 20 may include a pay-per-use metering application 21 that collects metrics data associated with operation of the computer system 11. For example, the metering application 21 may collect data related to processing time of central processing units (CPUs) of the computer system 11. The metering application 21 may log, or store, the collected metrics data for subsequent transfer (transmission) outside the computer system 11. Such data logging may occur initially in data log 40, which is maintained on the computer system 11. Alternatively, the metering application 21 (as well as any of the other applications 20) may transfer (transmit) the data. The metering application 21 is shown installed on the computer system 11. An alternate metering application 22 may be installed on a removable smart card 50.

In addition to or instead of metering applications 21 and 22, a digital rights management application 23 may be installed on the computer system 11. The digital rights management application 23 may collect data associated with copyrighted software or other digital works that are present on system 11. For example, the digital right management application 23 may collect data about software applications, music files, and other copyrighted media on system 11. The digital rights management application 23 may log, or store, the collected data for subsequent transfer (transmission) outside the computer system 11. Such data logging may occur initially in data log 41, which is maintained on the computer system 11. The digital rights management application 23 is shown installed on the computer system 11. An alternate digital rights management application 24 may be installed on a removable smart card 51.

As shown in FIG. 1, the applications 21 and 22 write to the data log 40, and the applications 23 and 24 write to the data log 41. Alternatively, the data logs 40 and 41 may be combined, and all the applications 21-24 may write to the combined data log. Also as shown in FIG. 1, the application 22 is installed on the smart card 50, and the digital rights management application 24 is installed on the smart card 51. The smart cards 50 and 51 may then be installed in the computer system 11, or in a peripheral device (not shown) of the computer system 11. Further, additional smart cards, each having one or more applications, may be installed in the computer system 11. In an embodiment, all applications may be installed on a single smart card, while in another embodiment, each application is installed on its own smart card.

Associated with each of the applications 21-24, and the data set 31 is a tamper-evidence device 60 that is intended to provide an indication that the application or data set has been altered, copied, or used in some unauthorized fashion. The tamper evidence device 60 may comprise a public key/private key pair, a series of unique identification numbers associated with each application or data set, and specific control features. The private key is unreadable by any program other than the application (or data set) with which it is associated. This prevents software on the computer system 11 from being used to modify the application or alter its functions. The application cannot be modified from the computer system 11, thereby providing a vendor of the application with confidence that the vendor's rights will not be infringed. As needed, the application may have direct access to data on the computer system 11, thereby preventing tampering of the data by the computer system 11. The discussion that follows will explain additional details of the structure and function of the tamper evidence system 10 and device 60, as well as the method of operation of the system and device, by way of specific embodiments thereof.

Instant Capacity On Demand (iCOD) permits a customer to scale up or scale down computer capacity as the customer's computing requirements change. To implement this model, a computer vendor needs a tamper-evident usage and accounting system. Unfortunately, guarding against customer tampering is complicated by the fact that the customer has access (either physical access or administrative privileges or both) to the iCOD computer that is being monitored. The customer may further have access to both the log file and software that created the log file, so that the log file may be subject to being reverse engineered even if the log file is encrypted. Furthermore, the customer may have an incentive to under report, or otherwise falsify CPU usage data, if given the chance to do so. To avoid these problems, an iCOD computer residing on an isolated site should be designed to discourage any reverse engineering or other tampering and to make such tampering evident to the iCOD computer vendor. Without such design features, a vendor likely would not install a conventional iCOD computer on these types of isolated networks because the vendor would have no way to know if reported CPU usage data were correct. The vendor would likely want a method for accounting and auditing usage to ensure that the customers were not tampering with the CPU usage data. Otherwise, the vendor would only be able to rely on the customer's word that only a certain number of CPUs are activated.

The iCOD computer could save usage data to a log file or a central metering device that a vendor employee could check periodically by visiting the site. However, such a log file or metering device could be edited or altered by the customer so that the log file underreports actual CPU usage. Likewise, a customer with a number of similar iCOD computers could try to replace a data log from a first iCOD computer with a data log from a second, lesser-used iCOD computer in an attempt to deliberately under report usage. Using a log file or metering device would still effectively require the vendor to have faith that the customer would not try and tamper with usage statistics. Thus any system or method for periodic usage reporting, including reporting through a network, should include safeguards to at least detect customer tampering with the usage report logging and generation process.

Public and private encryption/decryption key pairs, where data encrypted by a public key can only be decrypted with a corresponding private key, and vice versa, provide data confidentiality when encrypted with a public key, or provide authentication when encrypted with a private key. The public key is an encryption key which may be given to the general public. The corresponding private key, which is an encryption key that is a counterpart to the public key, is held by only one person or by a limited number of persons. Data that is encrypted with a public key can only be decrypted by the corresponding private key and data that is encrypted with the private key can only be decrypted using the corresponding public key. A public key may be distributed over public networks without fear that the public key could be used to decrypt data that was encrypted with the distributed public key.

The public-private key pair can ensure privacy of data that is being transferred from one party to another by ensuring that only intended recipients are able to read the transferred data. A data sender may encrypt the data using a recipient's public key. The data's intended recipient may then use the recipient's private key to decrypt the data. The intended recipient may be the only person holding the recipient's private key, and only the intended recipient is able to read the data.

More importantly, a public-private key pair may be used to authenticate the source of data being transferred by means of a digital signature, in which case each key may also be called a signature key. The data may be digitally signed by a signer that generates a digest from the data using a publicly available hash function. This digest is then encrypted with the signer's private key and affixed to the data creating a digital signature. A data recipient who seeks to validate the signature would then apply the public hash function to the received data to create the recipient's own digest and decrypt the signer's encrypted signature using a signer's public key to form the signer's original digest. The signer's public key would be a counterpart of the signer's private key and would theoretically be available publicly. The recipient would then compare the recipient's digest with the signer's original digest. If the recipient's digest matches the signer's digest, the digital signature is said to have been validated, and provides a high level of confidence that the document was actually signed by the signer. A match between the digests also provides a high level of confidence that the data contained in the document has not been modified between the time the data was signed and the time the signature was validated. Any public hash function may be used, provided that a non-signing person would be unable to use a different set of data to reproduce the digest within a computationally feasible time period. Although digital signing and validation does use encryption and decryption, digitally signing data of a document typically does not include encryption of the entire document, in order to allow for faster digital signatures, and is termed digital signing rather than encryption.

Digital signature technology may be used to effectively detect data tampering in the collection of iCOD or other metrics data, while encryption keeps the metrics data confidential to all but the customer and vendor. The tamper-evident computer metrics data collection system digitally signs all data that is collected, so that only data that has been created by the data collection software will be validated. Creating digital signatures of the data makes the data tamper-evident rather than tamper-proof because the customer is not prevented in an absolute sense from tampering with the data; however, any tampering would be detected when a vendor tries to validate the digitally signed data. Encryption of the collected data may be added to provide data privacy in cases where a computer system may be subleased to different parties. Encryption of the transmitted data may be added to provide data privacy in cases where the transmitted metrics data may be considered confidential by either the vendor or the customer.

Figure 2:
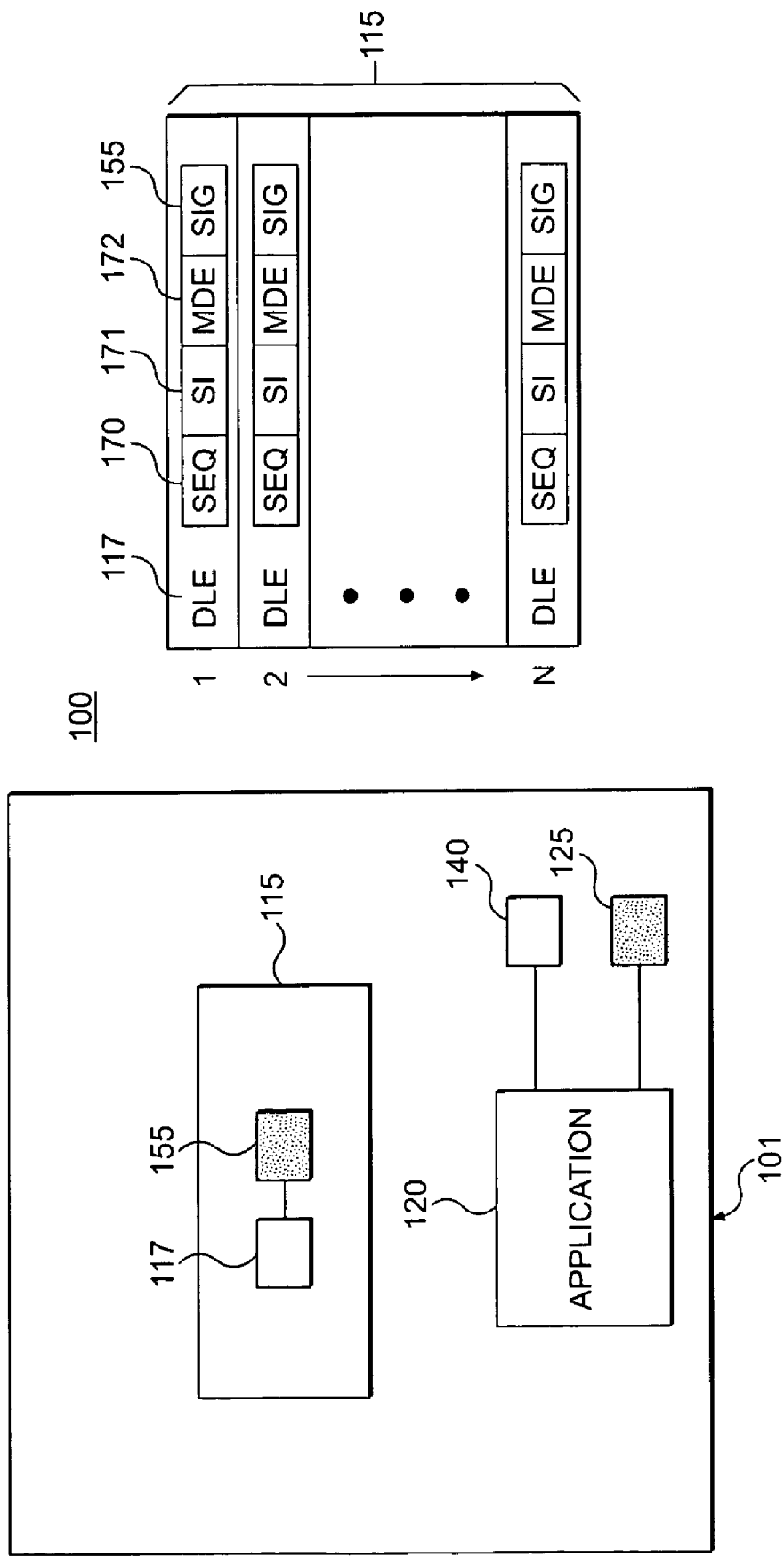
FIG. 2 is a block diagram of a computer system employing tamper-evident data management for metrics data collection.

FIG. 2 shows an embodiment of a tamper-evident computer metrics data collection system 100 installed on a computer system 101. The system 100 uses digital signatures to detect tampering of computer metrics data. The computer system 101 includes an application 120. The application program 120 may be a metering application for collecting metrics data elements such as CPU usage or other computer usage data, including the number of inactive iCOD processors, from the computer system 101. The application program 120 may be tailored to collect not only CPU activity and inactivity data for iCOD CPUs or iCOD hardware, but also data pertinent to pay-per-use (PPU) hardware or software usage data, such as number of users, CPU cycles, utilization time, and other criteria. The application program 120 may record the resulting metrics data to a data log 115, which may be a file or multiple files residing on the computer system 101. Optionally, the metrics data may be transferred to a remote site (not shown in FIG. 2). Each data log 115 is a data structure that has at least one data log entry 117, and may have multiple data log entries 117. When recording metrics data, each data log entry 117 may include a metrics data element 172 and may also include a sequence number 170 and system identification information 171 that identifies the computer system 101. The sequence number 170 increments each time a new data log entry 117 is created. The system identification information 171 identifies the computer system 101 from which the data is being collected, and may be a serial number. The data log entry 117 may have a digital signature 155 of the other elements in data log entry 117 attached to the data log entry 117. The data log entry 117 may be considered a row of data, as shown in FIG. 2.

The application program 120 may have access to an application private key 125, and may include a digital signing program for using the application private key 125 as described above. The application private key 125 is accessible only to the application program 120 and is used to digitally sign data log entries 117 before the data log entries 117 are saved to the data log 115. The application program 120 will also have access to the hash function (not shown) that is used to generate the digests that are encrypted as described above. This digital signing process allows the vendor to confirm or validate the source of the data log entry 117 because, as noted above, only the application program 120 has access to the application private key 125 needed to create the digital signature 155. The vendor may subsequently use an application public key 130 (see FIG. 3) to validate the resulting digital signatures 155 to confirm that the customer or some other source did not create digitally signed data entries.

The application program 120 may also link to a vendor public key 140, which may be made available to the general public, to encrypt the log file entries 117 and their corresponding digital signatures 155. Although the data log entries 117 have been digitally signed, the digital signatures 155 do not generally prevent access to the data log entries 117. The application program 120 may use the vendor public key 140 to encrypt the data log entries 117 into a form that only the vendor can decrypt by using a vendor private key 135 (see FIG. 3).

Figure 3:
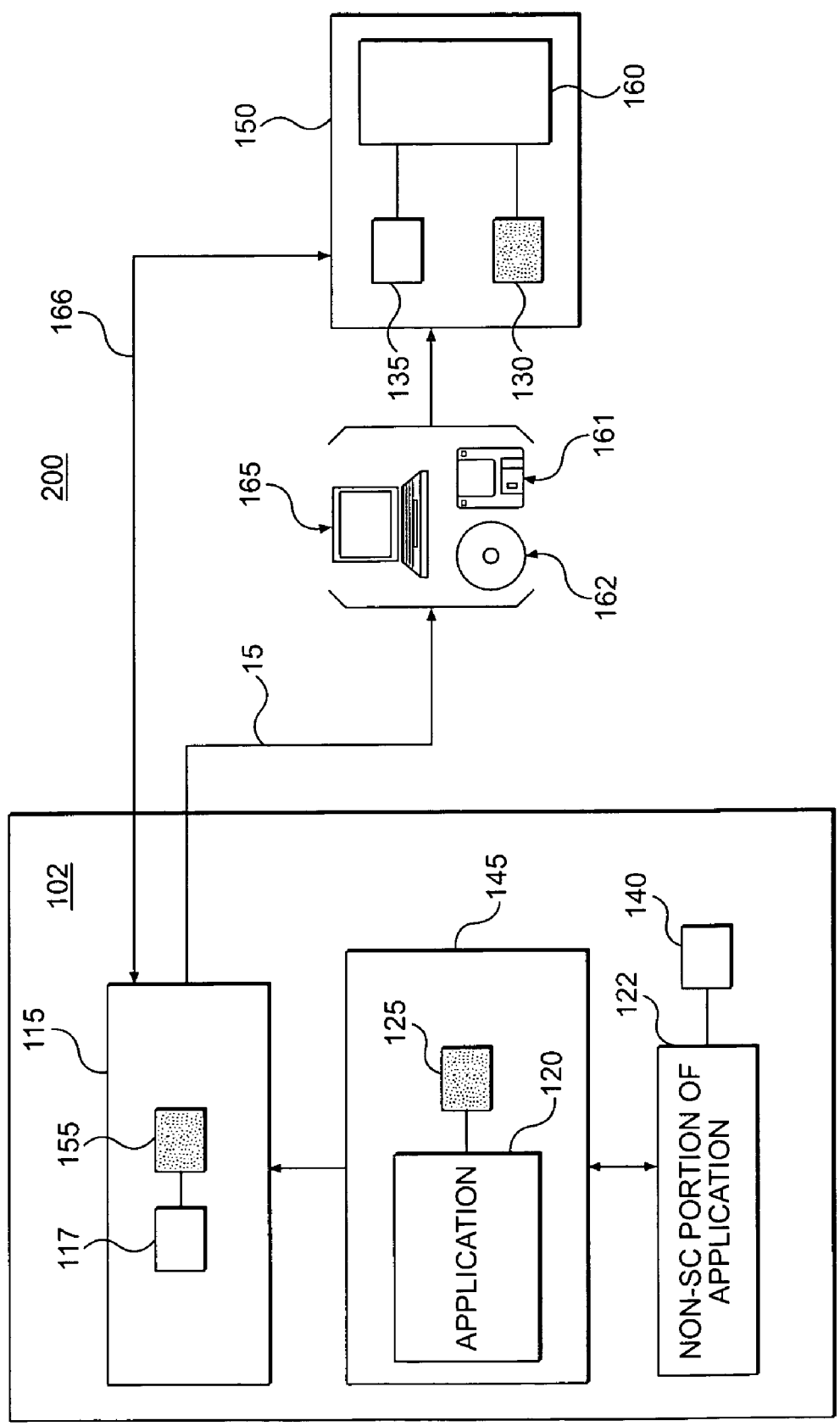
FIG. 3 is a block diagram of a computer system with a smart card for tamper-evidence.

Referring to FIG. 3, another embodiment of a tamper evident computer system 200 is shown in which the application private key 125 and the application program 120 are installed on a smart card 145 rather than directly onto a computer system 102. The private key 125 is unreadable by any program other than the data gathering/signing program (the application program 120) on the smart card 145. This prevents software on the computer system 102 from being used to forge signed data log entries 117. The application program 120 cannot be modified from the computer system 102, thereby providing the vendor with confidence that the collected and reported usage data are correct. Finally, the smart card 145, and the application program 120 on the smart card 145, have direct access to the usage data to be collected, thereby preventing tampering of the usage data by software on the computer system 102 before the usage data are collected by the application program 120.

This embodiment also prevents reverse engineering of the application program 120 and disclosure of the application private key 125. The computer system 102 may be configured so that removal of the smart card 145 disables the application program 120, where the metering application disabling would appear in the data log 115. The use of the smart card 145 would also make copying of the application private key 125 more difficult, because the application private key 125 would not be accessible except to the application program 120 on the smart card 145. The customer would be unable to read the binary code for the application program 120 and application private key 125 from the smart card 145, thereby discouraging reverse engineering of either the application program 120 or the application private key 125. Furthermore, the customer would be unable to secretly substitute an application that generates false data, because any tampering would be evident due to missing or invalid digitally signed data entries 117 in the data log 115. Any such attempt to tamper with the data log entry 117 may be detected upon audit by the vendor. The vendor public key 140 may also be included on the computer system 102 if the computer system 102 required privacy of customer data logs 115, although the vendor public key 140 need not reside on the smart card 145 in order to conserve space on the smart card 145 and for simplicity. A non-smart card portion 122 of the application that does not reside on the smart card 145 performs the encryption using the vendor public key 140.

The system 200 may also include a validation computer 150 for storing and decrypting the data log 115. The validation computer 150 will typically be controlled by the vendor and the validation computer 150 may be part of a regular billing computer residing at the vendor's site. The data log 115 may be transported to the validation computer 150 without needing to transmit the data log 115 on a network. Certain customers or vendors may download the data log 115 onto a floppy disk 161 or onto other media, such as a CD-ROM 162, so that the data log 115 can be carried to the validation computer 150 residing at the vendor site. Alternately, the vendor could bring a laptop computer 165 to download the data log 115 so that the data log 115 may be transported back to the validation computer 150 located at the vendor site. Customer sites where no electronic media is allowed to leave the site may require the vendor to place the validation computer 150 at the customer site but to keep the validation computer 150 under vendor (including physical) control (not shown). The customer site that forbids electronic media leaving the site may require that the vendor print out any validated and decrypted data logs 115 and bring the printout back to the vendor site for processing and billing.

The tamper-evident system 200 may also be used in environments where usage reports and metrics data may be transmitted through the Internet, other public networks or over private networks (e.g., a local area network (LAN)) such as the network 166. The iCOD reports that can be transmitted could include signed and encrypted data log entries 117. In an environment in which the network 166 is operable, individual data log entries 117 may be transmitted over the network (with the data log 115 as a backup). Such transmission may occur simultaneously, or near simultaneously with logging of the data log entries 117. Alternatively, such transmission may occur at a time later than logging of the data log entries 117. In an environment where the network 166 is not available, the data log entries 117 could be written to the log file 170 as the primary record of system usage. In this case, the data log 115 would serve as a backup for the secure usage reports that are actually sent over the network. For example, an iCOD system could periodically transmit iCOD reports to the vendor, but also maintain the data log 115 using the computer system 102 described above. The vendor may check the encrypted and signed data log 115 in the event that electronically transmitted iCOD reports are lost or delayed due to network outages. In addition, the computer system 102 may be configured to securely transmit the log file 115 and any other usage reports once network outages have been resolved.

The validation computer 150 may include validation software 160 for validating the data log 115. The validation software 160 may include a copy of the application public key 130 that corresponds to the application private key 125 present on the computer system 102. If encryption is used for the computer system 102, the validation software 160 may also include a copy of the vendor private key 135 that corresponds to the vendor public key 140 present on the computer system 101 of FIG. 2. The validation computer 150 may use the vendor private key 135 to decrypt each encrypted data log entry if necessary, and then uses the application public key 130 to "validate" the digital signature 155 attached to the data log entry 117. Validation of the signature may be done by creating a digest (not shown) of elements 170, 171, and 172 (see FIG. 2) in (decrypted if necessary) data log entry 117 using the same public hash function that was used in creating the digital signature 155, decrypting the digital signature 155 using the application public key 130 and verifying that the newly created digest matches the decrypted digital signature 155. In this way, the application public key 130 is used to validate that the application program 120 "signed" the data log 115.

Using the tamper-evident system 200 of FIG. 3, a sender is able to monitor and control application utilization by collecting data associated with the application, creating tamper-evident data records, and providing the tamper-evident data records. The step of providing the tamper-evident data records may include logging the tamper evident data records with the computer 102 or on the smart card 145 with an optional simultaneous or near-simultaneous, or an optional later transfer, of the data records to the validation computer 150. Such transfer may be by way of transmission over the network 166, or by use of physical media 161, 162 or the laptop computer 165. Alternatively, the step of providing the tamper-evident data records may include transmitting (transferring) the data records to the validation computer 150, and optionally storing the data records in the log file 115.

Figure 4:
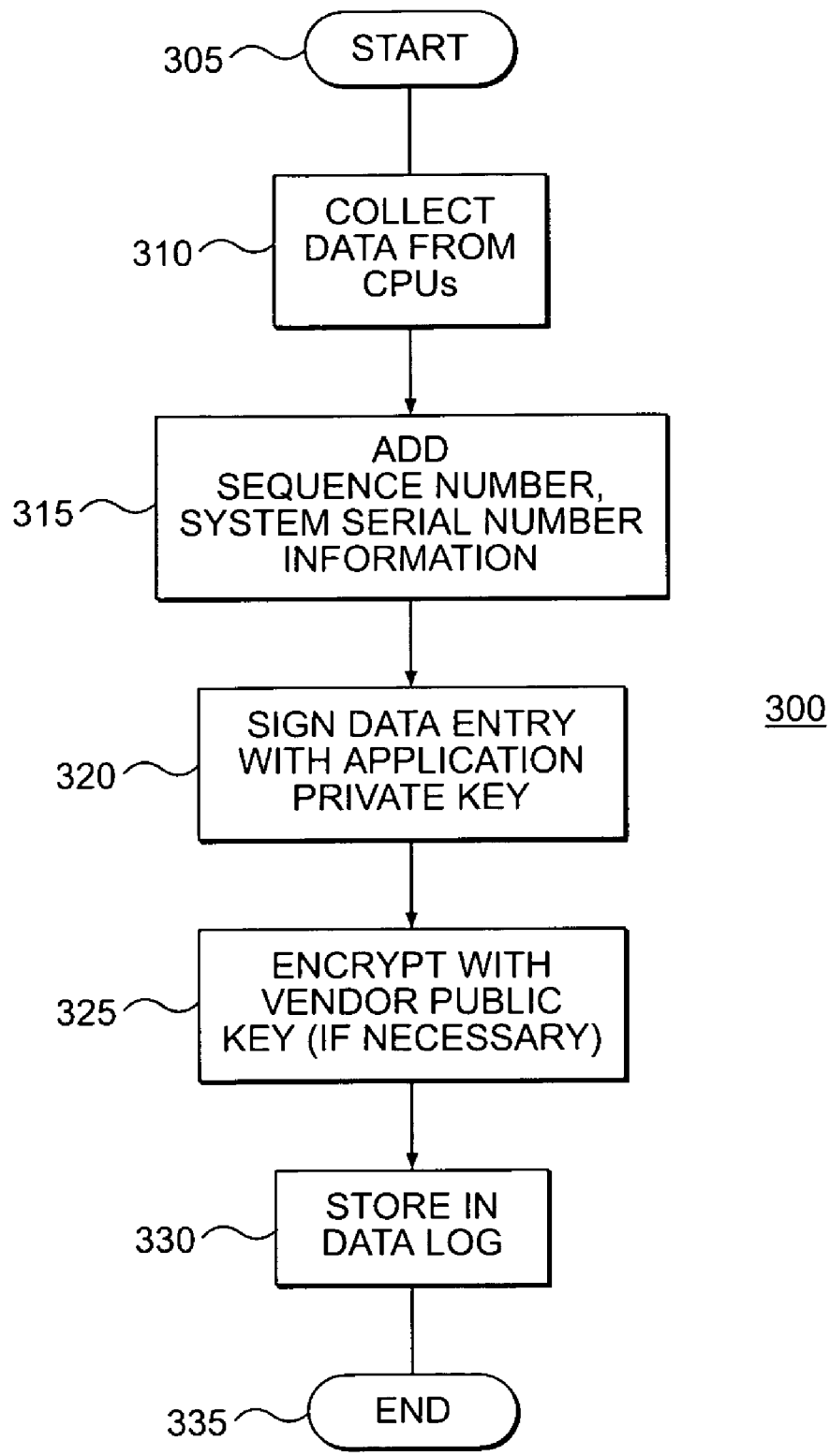
FIG. 4 is a flowchart illustrating a digital signing and encryption process.

FIG. 4 is a flowchart 300 illustrating one embodiment of method steps in collection and encryption of the data log 115, which in an embodiment may occur on the smart card 145. The application program 120 starts (step 305) by first collecting system metrics data 172, including CPU usage data, hard disk usage, and other pertinent parameters, from the computer system 101 (step 310). The data may then be processed to add the sequence number 170 and system identification information 171 to form the data log entry 117 (step 315). A timestamp may also be added. Once the sequence number 170, system identification information 171 and optional timestamp have been added, the application program 120 may digitally sign the data log entry 117 (step 320), by first creating a digest (not shown) of elements 170, 171, and 172 in data log entry 117 using the public hash function and encrypting the digest using the application private key 125, resulting in a digital signature 155 that is attached or affixed to the data log entry 117, either linked to the data log entry 117 or as part of the data log entry 117 itself. As noted above, the application private key 125 may be available only to the application program 120, providing a high degree of certainty that the encrypted digest, and hence, the original data log entry 117, was produced by the application program 120. The public hash function, as noted above, is designed to be computationally unlikely or infeasible to reproduce a given hash, making duplicating a given digest from a different set of data also computationally unlikely. Any digest that has been digitally signed with the application private key 125 thus is presumed to have been generated by that application program 120.

Once the data log entry 117 has been digitally signed, the application program 120 then may encrypt the data log entry 117 and the corresponding digital signature 155 with the vendor public key 140 (step 325) prior to storing the encrypted data log entry 117 and encrypted digital signature 155 in the data log 115 (step 330). The application program 120 then has finished collecting and storing the data log entry 117 (step 335). Even with the added protection of a digital signature 155, anyone theoretically could read the data log 115 because the digital signature 155 by itself does not prevent others from accessing the data log entry 117. Encryption may be added to keep the customer's data log 115 confidential from other customers such as when different customers sublease usage on the same computer system 102. Encryption with the vendor public key 140 ensures that the encrypted and signed data log 115 can only be read by the vendor holding the vendor private key 135.

The sequence numbers 170 and system identification information 171 may be placed in each data log entry 117 and thus the data log 115 in order to make any customer tampering evident. The sequence numbers 170 and system identification information 171 will be digitally signed along with the data itself. The sequence numbers 170 allows the vendor to detect when a customer replaces data log entries 117 from a heavy utilization period with data log entries 117 from a light utilization period, because the sequence numbers 170 would be out of sequence in such a replacement. The system identification information 171 would similarly discourage the customer from switching one or more data log entries 117 from one computer system 101 to another. The switched data log entries 117 would have system identification information 171 that did not match the system 102 for which the data log entries 117 were purportedly generated. The customer is not strictly prevented from tampering with the data log 115, but the sequence numbers 170 and system identification information 171 would make any tampering evident to the vendor that is auditing the data log 115.

Digital signing may occur on the smart card 145, but the data log 115 may be stored on the computer system 102. Forming the data log entry 117 by adding the sequence numbers 170 and system identification information 171 (and optional timestamp) to the system metrics data 172 (step 315) may take place on the smart card 145. Similarly, the sequence numbers 170 and system identification information 171 may be generated on the smart card 145 to increase the degree of tamper-evident protection. Otherwise, removal of records from the computer system 102 could cause sequence numbers 170 to be re-used, allowing missing data log entries 117 to go undetected. Each digitally signed data log entry 117, and thus the data log 115, are eventually stored onto the computer system 102 rather than the smart card 145. Consequently, digitally signing elements 170, 171, and 172 of data log entry 117 to form a digital signature 155 may occur on the smart card 145 to discourage tampering of the data prior to storage on the computer system 102. Encryption with the vendor public key 140 (step 325) may occur on the computer system 102 rather than the smart card 145, however, to conserve space on the smart card 145. There is no need to protect the vendor public key 140 from being reverse engineered because the vendor public key 140 is already theoretically available to the public.

A computer system 101, such as that shown in FIG. 2, that does not use the smart card 145 may perform both the data collection and digital signing functions on the computer system 101 itself. Encryption, if necessary, may also occur on the computer system 101, just as in the computer system 102 that use the smart card 145. Furthermore, the encrypted data log entry 117 need not be stored in the data log 115 (step 330), but may instead be transmitted to a remote site over a network. In another alternative embodiment, the data log entry 117 may be stored in the data log 115, and may subsequently be provided to the vendor site by, for example, transmission over the network.

Figure 5:
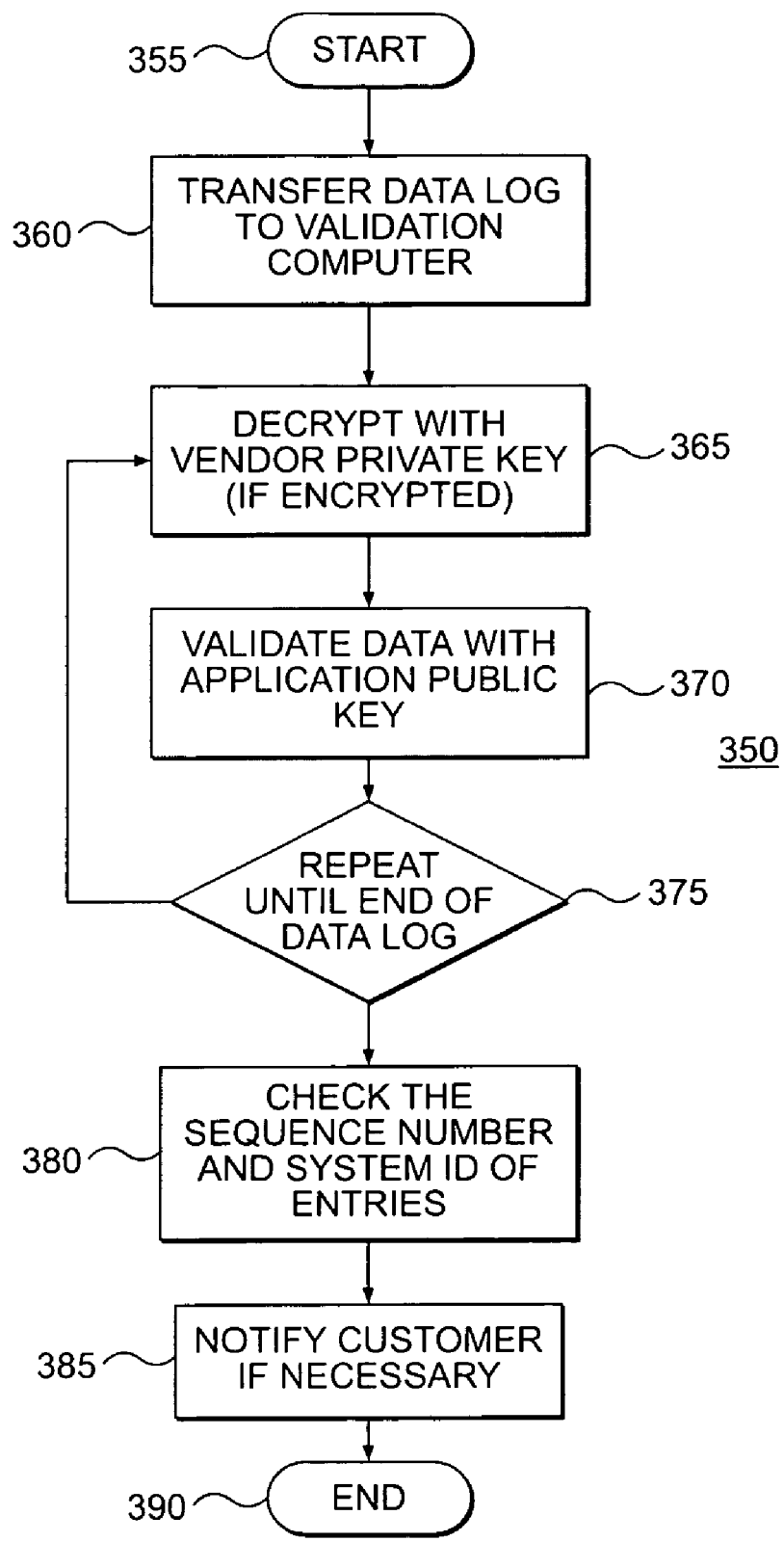
FIG. 5 is a flowchart illustrating a decryption and digital signature validation process.

FIG. 5 is a flowchart 350 illustrating steps in validating the data. The program starts (step 355) and the data log 115 is copied to the validation computer 150 through an intermediary device or medium (step 360). The data log 115 may be downloaded onto removable media, such as a CD-ROM 162 or floppy disk 161, which may be carried to validation computer 150 and read by the validation computer 150. The data log 115 may also be downloaded onto the laptop 165 or other portable computer that can be carried and linked to the validation computer 150. The data log 115 also may be transmitted to a remote system (comprising, for example, the validation computer 150) over a network connection. The software on the validation computer 150 may then decrypt each of the data log entries 117 in the data log 115 using the vendor private key 135 if the customer data has been encrypted (step 365). The use of the vendor public and private keys 140, 135 ensures that only the vendor can decrypt the data log 115 on the computer system (i.e., either the computer system 101 (FIG. 2) or 102 (FIG. 3)), to preserve confidentiality of the data log 115. After each data log entry 117 has been decrypted with the vendor private key 135, the computer 150 will then use the application public key 140 to "validate the signature" created by the application private key 125, by creating a second digest of elements 170, 171, and 172 in the data log entry 117, decrypting the digital signature 155 for the data log entry 117, and comparing the second digest with the decrypted digital signature, as detailed above (step 370). If the second digest matches the decrypted digital signature, the signature is then considered validated, which gives the vendor a high degree of confidence that the application program 120 did actually generate the data log entry 117. (This degree of confidence is warranted provided the application private key 125 has not been compromised). The match between the second digest and the decrypted digital signature also provides a high level of confidence that the data log entry 117 has not been modified between the time the data log entry 117 was signed and validated. The computer 150 can then proceed to the next data log entry 117 (step 375). The data from all data log entries 117 are all decrypted and validated for analysis in this fashion.

The data log 115 is then further inspected by the vendor for evidence of customer tampering. The number of data entries are checked to see that the application program 120 was operational during the time since the previous vendor visit. The sequence numbers 170 of the data log entries 117 are also checked for gaps or data log entries 117 that are out of sequence (step 380). The data log 115 is additionally inspected for correct system identification information and the sequence numbers 170. Inconsistencies in the system identification information or the sequence numbers 170 would provide evidence of tampering with the data log 115.

A contractual agreement between the customer and the vendor may require a minimum payment for any non-legitimate gaps or irregularities in the data log 115. Alternately, the vendor could impose a fixed penalty for disabling the data log 115. Any penalty or minimum payment may be calculated as part of a notification to the customer to pay additional fees (step 385). This completes the process of validating the metrics data and billing the customer (step 390).

Figure 6:
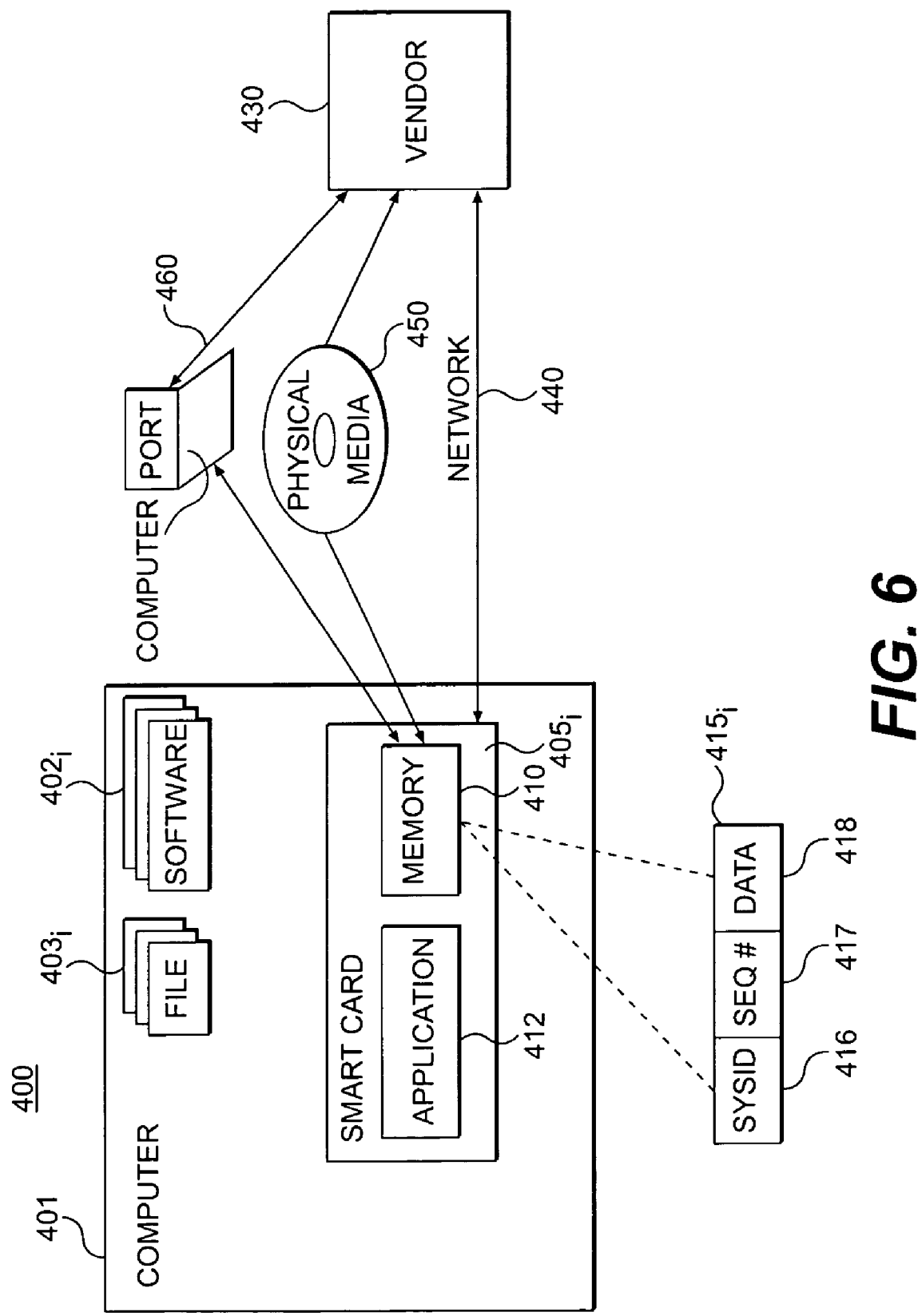
FIG. 6 is another block diagram of a tamper-evident data management system.

FIG. 6 is a block diagram of an alternate system 400 for detecting tampering of usage data. In FIG. 6, a client computer 401 includes a plurality of software applications $402_i$; and digital media files $403_i$ for which a third party asserts some form of property right. The files $403_i$ may include licensed copyrighted works, such as electronic books, and other files that are protected as intellectual property, for example. When one or more of the software applications $402_i$ or the files $403_i$ are loaded onto the computer 401, a smart card 405 may also be installed on the computer 401. The smart card $405_i$ may include an application 412 that monitors the software applications $402_i$ and the files $403_i$; identifies the software applications $402_i$ and the files $403_i$; and creates tamper evident data records 418 for logging (in the computer 401, or the smart card $405_i$), or for transmission to a vendor computer, or both. The tamper evident data records, when logged, may be stored in a memory 410. As shown in FIG. 6, the memory 410 is located on the smart card $405_1$. In an alternative embodiment, the memory 410 may be located anywhere on the computer 401, or in a device that is coupled to the computer 401.

The memory 410 may store tamper evident data record 418 in a file $415_i$, and in association with the record 418, may also store information related to the computer 401, including an identification 416 of the computer 401, and a sequence number 417 for tamper evident data records having a sequential nature. The record 418 may then be signed and optionally encrypted. The signed and encrypted record 418 and the file $415_i$ may then be transmitted to a vendor site 430 for monitoring and billing purposes, for example. The mode of transmission may include transmission over a network 440, or physical removal of the smart card $405_i$ (or other data storage device) from the computer 401 and connection of the smart card $405_i$ to a device at the vendor site 430 that can decrypt and read the usage data 418. The mode of transmission may also involve bringing a portable computer 460, for example, from the vendor site 430 to the site of the computer 401, and recording the records 418 on the portable computer. Finally, the records 418 may be written to removable physical media 450.

While the tamper-evident data management system and method have been described with reference to the embodiments thereof, those of ordinary skill in the art will appreciate that various modifications can be made to this structure and function of the individual parts of this system and method without departing from the spirit and scope of the invention as a whole.

The invention claimed is:

1. A data tampering detection system that detects alteration of data resident on a computer, the system implemented on a suitable processing platform, comprising:

a data collecting application that collects the data for storage in a digitally signed data log entry;

a digital signing application, comprising:

a mechanism for assigning to the data for the log entry, a sequence number and an identification number of the computer, a link to a hash mechanism that generates a digest of at least the sequence number and identification number, and a digital signature mechanism that creates a digital signature and digitally signs the digest, wherein the digital signing application and the data collecting application are located on a smart card, and wherein removal or disabling of the smart card disables the data collecting application and the digital signing application;

a data writing application that writes the digitally signed digest and the data to a data log as the digitally signed data log entry, wherein the digitally signed data and digest are stored on a physical media, and wherein the digitally signed data and digest are transmitted to a vendor by removal of the physical media;

an encryption mechanism to encrypt the digitally signed digest and the data; and a decryption mechanism to decrypt the digitally signed digest and the data.

2. The system of claim 1, wherein the encryption mechanism comprises:

a public encryption key that is supplied by a vendor; and an encryption application.

3. The system of claim 1, wherein the decryption mechanism comprises:

a private decryption key that corresponds to the public encryption key; and a decryption application, wherein the decryption application uses the decryption key for decrypting the encrypted digitally signed data.

4. The system of claim 1, further comprising a validation application that collects and validates the digitally signed digest, wherein the validation application comprises:

the hash mechanism that generates a second digest corresponding to the digest generated by the data signing application; and a mechanism for comparing the two digests, wherein if the two digests are not identical, the collected data shows evidence of tampering.

5. The system of claim 4, wherein the validation application is stored on a computer system controlled by a vendor.

6. The system of claim 1, wherein the digitally signed data and digest are transmitted to a vendor over one of a public network and a private network.

7. A method for securely gathering data, comprising:

gathering data from a computer system;

digitally signing the data with a private signature key that is specific to a particular instance of the method, comprising:

creating a digest of the data using a hash function, encrypting the digest using the private signature key, thereby creating a digital signature for the data, wherein the digitally signed data and digest are stored on a physical media, and wherein the digitally signed data and digest are transmitted to a vendor by removal of the physical media, and attaching the digital signature to the metrics data, thereby forming digitally signed data, wherein the method has exclusive access to the private signature key;

adding a sequence number to the data prior to digitally signing the metrics data, thereby making removal of data entries evident; and providing the digitally signed data to a validation application that validates the digitally signed data using a public signature key that is a counterpart of the private signature key, wherein the digital signing application, and the data collecting application are located on a smart card, and wherein removal or disabling of the smart card disables the data collecting application and the digital signing application.

8. The method of claim 7, further comprising validating the digitally signed data.

9. The method of claim 8, further comprising:

encrypting the digitally signed data with a public key, wherein the public key is supplied by a vendor; and decrypting the encrypted and signed data using a private key provided by the vendor prior to validating the decrypted and signed data.

10. The method of claim 7, further comprising adding information identifying the computer system to the data prior to digitally signing the data, thereby making transfer of the data from a different computer system evident.

11. The method of claim 7, further comprising adding time stamp information to the data.

12. The method of claim 7, further comprising recording shut down and startup events for the computer system with the data.

13. The method of claim 7, wherein gathering data further includes taking data snapshots of utilization for the computer system and storing the resulting data snapshots as the data.

14. The method of claim 7, wherein gathering data further includes calculating system utilization averages for the computer system and storing the resulting averages as the data.

15. The method of claim 7 wherein validating the digitally signed data further comprises:

creating a second digest of the data using the hash function;

decrypting the digital signature attached to the data; and comparing the decrypted digital signature with the second digest, wherein the data is validated if the decrypted digital signature matches the second digest.

16. The method of claim 15, further comprising checking the consistency of sequence numbers of data entries.

17. The method of claim 16, wherein the step of checking consistency comprises comparing sequential entries, whereby consistency is indicated by increasing sequential numbers with no gaps.

18. The method of claim 7, wherein the step of providing the digitally signed data to the validation application comprises one of transmission over a public network, and transmission over a private network.

* * * * *